E. K. H. LUNDBERG.
SMELTING FURNACE.
APPLICATION FILED JULY 14, 1916.
1,278,696.
Patented Sept. 10, 1918.
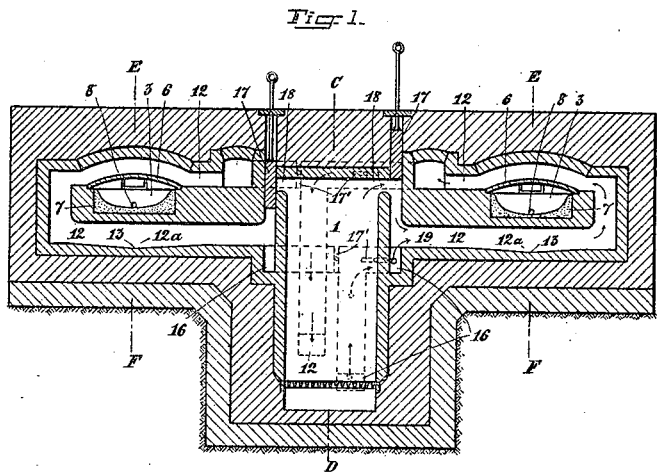
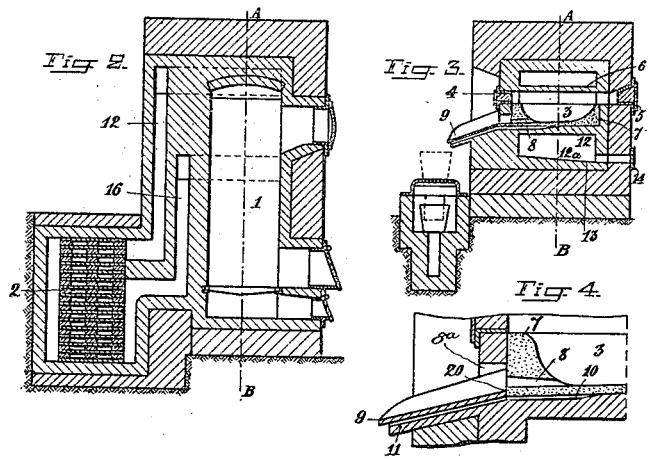
E. K. H. Lundberg
Inventor.
By Albert H. Parker
Attorney.

UNITED STATES PATENT OFFICE.

ELOF KARL HJALMAR LUNDBERG, OF BRUZAHOLM, SWEDEN.

SMELTING-FURNACE.

1,278,696.  Specification of Letters Patent.  Patented Sept. 10, 1918.

Application filed July 14, 1916. Serial No. 109,361.

*To all whom it may concern:*

Be it known that I, ELOF KARL HJALMAR LUNDBERG, a subject of the King of Sweden, and resident of Bruzaholm, in the Kingdom of Sweden, have invented certain new and useful Improvements in Smelting-Furnaces, of which the following is a specification.

The present invention relates to smelting furnaces.

The invention has for its object, a furnace for smelting copper, brass or similar metals or metal alloys. In a furnace constructed according to the present invention, which furnace may be provided with one or more smelting chambers, which are completely separated, the smelting operation takes place without the use of crucibles, so that the smelting process is rendered profitable in an economical respect. This economical advantage is increased due to the fact that only a minimum loss of metal is caused by vaporization or combustion. A smelting furnace according to the present invention is principally characterized by the fact that the smelting chamber or each smelting chamber when more than one is employed, consists of a chamber located in or formed by the structure or the brickwork of the furnace and, by means of an arch arrangement or the like, completely separated from the combustion gases and furthermore provided with a top hole for the molten metal, said chamber being, during the smelting operation, separated from the atmospheric air by means of gas tight doors or the like and heated from above and from below as well as from one or more sides.

The annexed drawing shows as an example and schematically a smelting furnace carried out in accordance with the present invention and provided with two smelting chambers. Figure 1 is a longitudinal section through the furnace along the line A—B in Figs. 2 and 3 respectively. Fig. 2 is a cross section of the furnace along the line C—D in Fig. 1. Fig. 3 is also a cross section through the furnace along one of the lines E—F in Fig. 1. Fig. 4 shows a detail.

The furnace is provided with an ordinary gas producer 1 having a regenerator 2. The gas producer has two outlets for the gas, one for each of the smelting chambers 3. Each smelting chamber is provided with a charging door 4 and with a slag discharging door 5, said doors forming gas tight closing devices for the openings in which they are located. The smelting chambers are covered with arches or vaults 6 and in each of them there is located a vessel or receptacle 7, forming the hearth and containing the metal during the smelting operation. The receptacles 7 are provided with tap holes 8 for the molten metal, and outside these holes there are provided troughs 9. These troughs extend inwardly to the receptacles 7 through holes 8ª provided in the brick work of the furnace, the molten metal being thus tappped off through the holes 8. The bottom of each smelting chamber 3 is inclined and is provided with channels 10 which communicate with an outlet channel 11 (see Fig. 4) located under the trough 9. Each of the bottoms of the gas channels 12 is formed with a transverse depression 12ª the deepest part of which is situated under the smelting chamber. The bottom 13 of said depression slopes toward one side of the furnace and ends at an outlet 14 (see Fig. 3). The gas channels 12 extend around the completely separated smelting chambers and continue to the regenerator. The smelting chambers are heated from above and from below as well as from the sides (through the intensely heated brick work). The course of the gases around the right hand chamber and to the regenerator is shown by arrows in Fig. 1 and further described hereinafter.

Dampers 17 control the flow of gas from the gas producer the right hand one being shown in its open position in Fig. 1. Dampers 17′ control the flow of gas to the regenerator after leaving the furnace and the right hand one is shown rotated into its open position. The secondary air passes through the regenerator in the ordinary manner and then through the air channels 16 and dampers 17″ control the flow of such air into the furnace the right hand one being shown open.

When smelting is to be performed in the furnace, the dampers 17, 17′ and 17″ of the gas and air channels, leading to and from the furnace, in which smelting is to take place, are held open, while the remaining dampers are shut. The gas generated in the gas producer passes through an outlet 18 and is ignited when meeting the secondary air at 19, after which the combustion gases pass around the smelting chamber or chambers, then through the regenerator and finally escape through the chimney. The receptacles 7 are made of a material which is not in any way attacked by molten metal. They are inserted in an unburnt condition into the smelting chambers, and as the temperature rises in a smelting chamber, the receptacle therein is burnt. When the temperature in the smelting chamber has reached the temperature required for smelting the metal, the latter is introduced into the receptacle. The latter stands quite freely in the smelting chamber and has, consequently, the opportunity of changing its form and size as heating and burning take place. The regenerator is sufficiently heated in order that the secondary air may meet the gas with such a high temperature that the required smelting heat is attained and that the smelting will be economical.

Even if a receptacle can withstand several smelting operations, it will sooner or later break. When the metal on such an occasion passes through the receptacle, it will follow the inclined bottom of the smelting chamber and continue to the channels 10 which collect the same and conduct it to the outlet 11. If also the bottom of the smelting chamber would after some time be broken through, the metal will be collected in the inclined channel 12ª located under the smelting chamber and will flow off through the outlet 14.

By the apparatus described two smelting chambers are combined with a common gas producer having a regenerator, and with such damper or other shutting off arrangements between the smelting chambers and the gas producer that one or both smelting chambers may be thrown out of operation for repairing and then be again immediately brought into operation.

Having now described my invention, what I claim as new and desire to secure by Letters Patent is:

1. A smelting furnace comprising a smelting chamber completely closed against the entrance of the combustion gases, means adapted to permit the combustion gases to heat said chamber above, below and at the side thereof, and an independent seamless vessel permanently located in said smelting chamber and capable of containing all the metal when in a molten state, said vessel being provided with a tap hole for the molten metal leading out from the lower part thereof.

2. A smelting furnace comprising a smelting chamber completely closed against the entrance of the combustion gases, and means adapted to permit the combustion gases to heat said chamber above, below and at the side thereof, and a seamless hearth member inserted into said chamber in an unburnt condition said hearth member being provided with a tap hole.

3. A smelting furnace comprising a smelting chamber completely closed against the entrance of the combustion gases, a channel for said gases passing below, at the side of, and above said chamber, an independent seamless vessel permanently located in said chamber and having a tap hole, said chamber being also provided with a tap hole at its lower part for the molten metal, an inclined floor at the bottom of the gas channel where the latter passes below the said chamber, and means for leading out of the furnace any metal which may leak through the bottom of the smelting chamber onto said floor.

In witness whereof I have hereunto set my hand in presence of two witnesses.

ELOF KARL HJALMAR LUNDBERG.

Witnesses:
D. B. OHLSSON,
CARL TH. SUNDHOLM.